(12) United States Patent
Dvorkis et al.

(10) Patent No.: US 7,441,902 B2
(45) Date of Patent: Oct. 28, 2008

(54) LARGE SIZE IMAGE PROJECTION

(75) Inventors: Paul Dvorkis, East Setauket, NY (US);
Ron Goldman, Cold Spring Harbor, NY (US); Chinh Tan, Setauket, NY (US);
Dmitriy Yavid, Stony Brook, NY (US);
Frederick F. Wood, Medford, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 33 days.

(21) Appl. No.: 10/975,889

(22) Filed: Oct. 27, 2004

(65) Prior Publication Data

US 2006/0087628 A1 Apr. 27, 2006

(51) Int. Cl.
*G03B 21/14* (2006.01)
(52) U.S. Cl. ............... 353/30; 353/94; 345/1.3
(58) Field of Classification Search ............. 353/94, 353/30, 48, 33, 98, 99; 372/38.02, 15; 352/133; 348/744, 745, 7
See application file for complete search history.

(56) References Cited

U.S. PATENT DOCUMENTS

| | | | | |
|---|---|---|---|---|
| 5,777,804 A * | 7/1998 | Nakamura et al. | ........... | 359/727 |
| 6,128,131 A * | 10/2000 | Tang | ............ | 359/443 |
| 6,538,705 B1 * | 3/2003 | Higurashi et al. | ........... | 348/745 |
| 6,760,506 B2 * | 7/2004 | Laor | ............ | 385/18 |
| 6,832,724 B2 * | 12/2004 | Yavid et al. | ............ | 235/454 |
| 6,869,185 B2 * | 3/2005 | Kaminsky et al. | ............ | 353/31 |
| 6,945,652 B2 * | 9/2005 | Sakata et al. | ............ | 353/30 |
| 7,199,933 B2 * | 4/2007 | Yavid et al. | ............ | 359/626 |
| 7,292,207 B1 * | 11/2007 | Naegle et al. | ............ | 345/1.3 |
| 2001/0046033 A1 * | 11/2001 | Troyer | ............ | 353/31 |
| 2002/0036828 A1 * | 3/2002 | Wong | ............ | 359/585 |
| 2002/0172430 A1 * | 11/2002 | Sato | ............ | 382/240 |
| 2003/0160946 A1 * | 8/2003 | Yamanaka | ............ | 353/30 |
| 2003/0223043 A1 * | 12/2003 | Yoshino | ............ | 353/10 |
| 2004/0004775 A1 * | 1/2004 | Turner et al. | ............ | 359/877 |
| 2004/0017518 A1 * | 1/2004 | Stern et al. | ............ | 348/744 |
| 2005/0083492 A1 * | 4/2005 | Taubenberger | ............ | 353/94 |
| 2005/0110959 A1 * | 5/2005 | Miyazawa et al. | ............ | 353/94 |
| 2005/0140568 A1 * | 6/2005 | Inazumi | ............ | 345/1.3 |
| 2005/0140930 A1 * | 6/2005 | Dvorkis et al. | ............ | 353/31 |
| 2007/0103652 A1 * | 5/2007 | Nijim et al. | ............ | 353/94 |

\* cited by examiner

*Primary Examiner*—William C. Dowling
(74) *Attorney, Agent, or Firm*—Kirschstein et al.

(57) ABSTRACT

A plurality of image projection modules is operative for causing selected pixels in overlapping raster patterns to be illuminated to produce a large size image of high resolution of VGA quality in monochrome or color. The selected pixels in an overlap region of the patterns are illuminated at a lesser intensity to provide uniform brightness over the image. Multiple single mode lasers, or a multimode laser with an aperture stop, are employed to increase laser output power. Speckle noise is reduced by controlling the optical transmission characteristic of a projection screen. Three-dimensional images are generated by moving the screen. Cross-coupling between drive and feedback mechanisms in image projection is reduced for better image quality.

7 Claims, 8 Drawing Sheets

LARGE SIZE IMAGE PROJECTION

BACKGROUND OF THE INVENTION

1. Field of the Invention

The present invention generally relates to projecting two-dimensional images of large size, especially using single mode laser sources or multimode laser sources, to reducing speckle noise, to creating three-dimensional displays, and to minimizing cross-coupled signals in drive mechanisms and pick-up mechanisms used in image projection.

2. Description of the Related Art

It is generally known to project a two-dimensional image on a screen based on a pair of scan mirrors which oscillate in mutually orthogonal directions to scan a laser beam over a raster pattern. However, the known image projection systems project an image of limited resolution, typically less than a fourth of video-graphics-array (VGA) quality of 640×480 pixels, and of limited size. In the case of a color image formed by laser beams of different wavelengths (colors), some laser sources, for example, red semiconductor single mode lasers have insufficient power to produce a color image of uniform brightness. The use of multimode red lasers having higher power is however restricted by their highly divergent laser beams. Speckle noise, which is caused by the coherent nature of laser light, is an omnipresent problem that detracts from good display quality. The known projected images are two-dimensional, which lacks the greater realism of a three-dimensional display. Also, the known drive mechanisms used to oscillate the scan mirrors are identical to pick-up mechanisms used to generate positional information from the oscillating mirrors. These identical mechanisms result in cross-coupled signals which lead to noise and distortion.

SUMMARY OF THE INVENTION

Objects of the Invention

Accordingly, it is a general object of this invention to provide an image projection system that projects a sharp and clear, two-dimensional image of large size.

Another object of this invention is to project color images of uniform brightness.

Still another object of this invention is to reduce speckle noise in image projection systems.

Yet another object of this invention is to create realistic three-dimensional color images.

An additional object is to eliminate cross-coupling between identical drive and pick-up mechanisms used to project images in such projection systems.

FEATURES OF THE INVENTION

In keeping with these objects and others which will become apparent hereinafter, one feature of this invention resides, briefly stated, in an arrangement for projecting a two-dimensional image, the arrangement including a plurality of image projection modules, each module having a support, for example, a printed circuit board; a laser, for example, a solid-state laser, for emitting a laser beam; a scanner for sweeping a pattern of scan lines in space at a variable distance from the module, each scan line having a number of pixels, each pattern being partly overlapped at an overlap region; and a controller operatively connected to each laser and each scanner, for causing selected pixels to be illuminated, and rendered visible, by each laser beam to produce the image from each pattern, the selected pixels in the overlap region being illuminated at a lesser intensity than selected pixels not in the overlap region.

In accordance with one aspect of this invention, the image produced from each pattern is larger in size than the image produced by any one of the patterns. The overlap region prevents any undesirable seams from marring an observer's view of the image. By reducing the intensity of the selected pixels in the overlap region, bright spots and uneven brightness across the image are eliminated.

In the preferred embodiment, each scanner includes a pair of oscillatable scan mirrors for sweeping the respective laser beam along generally mutually orthogonal directions at different scan rates and at different scan angles. At least one of the scan rates exceeds audible frequencies, for example, over 18 kHz, to reduce noise. At least one of the scan mirrors is driven by an inertial drive to minimize power consumption. The image resolution preferably exceeds one-fourth of VGA quality, but typically equals or exceeds VGA quality. The support, laser, scanner, and controller of each module preferably occupy a volume of less than five cubic centimeters, and typically less than 3½ cubic centimeters.

Another feature of this invention resides in increasing laser output power by using a plurality of single mode, lower power lasers, and by independently energizing each laser at a different time during a predetermined frame interval to illuminate a selected pixel. Laser output power can also be increased by using a multimode laser in combination with an aperture stop to block those parts of the diverging beam not needed to illuminate a selected pixel.

Still another feature resides in reducing speckle noise by producing a plurality of reflections at each pixel. In the case of a front projection screen, it can be constituted of a slightly transmissive material to produce the multiple reflections. In the case of a rear projection screen, the thickness and optical transmission characteristic of the screen are factors that control the multiple reflections. Speckle noise can also be reduced by using multiple lasers with the same wavelength.

A three-dimensional display can be created on a screen by moving the screen back and forth along the direction of propagation of the laser beam or beams incident thereon, and by focusing the beam or beams at each position of the screen. The screen could also be rotated.

The projected image can be used for advertising or signage purposes, or for a large-sized television or computer monitor screen, and, in short, for any purpose desiring something to be displayed.

Still another feature is embodied in minimizing cross-coupled signals in image projection arrangements. For example, if a piezoelectric drive mechanism is used to oscillate a scan mirror, and if an identical piezoelectric pick-up mechanism is used to generate a feedback signal indicative of the position of the oscillating mirror, then mechanical vibrations induced by the drive mechanism interferes with the pick-up mechanism and, as a result, a clean feedback signal is not generated, thereby ruining high quality image projection.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
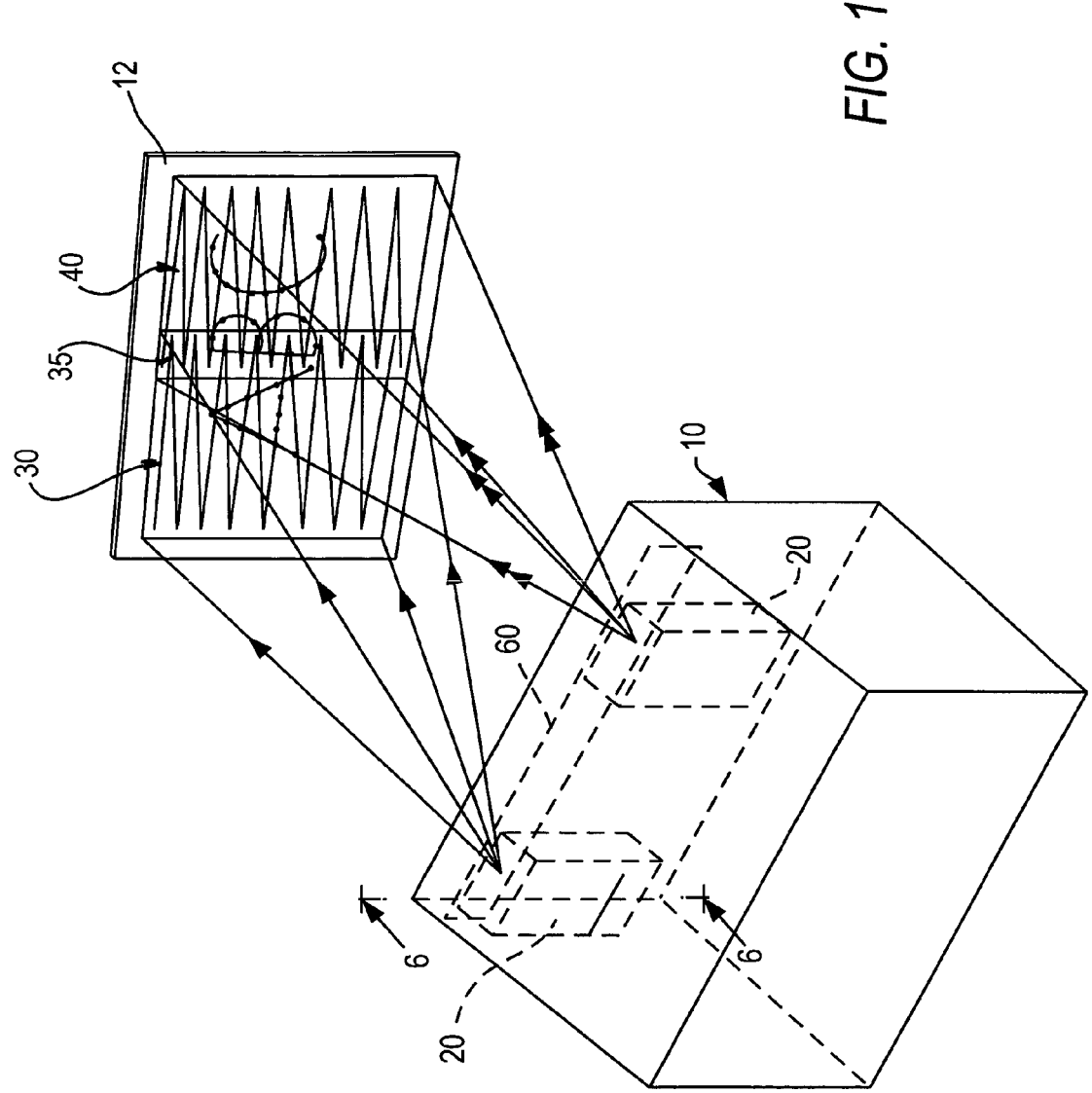
FIG. 1 is a perspective view of an arrangement for projecting an image of large size in accordance with this invention.
Figure 2:
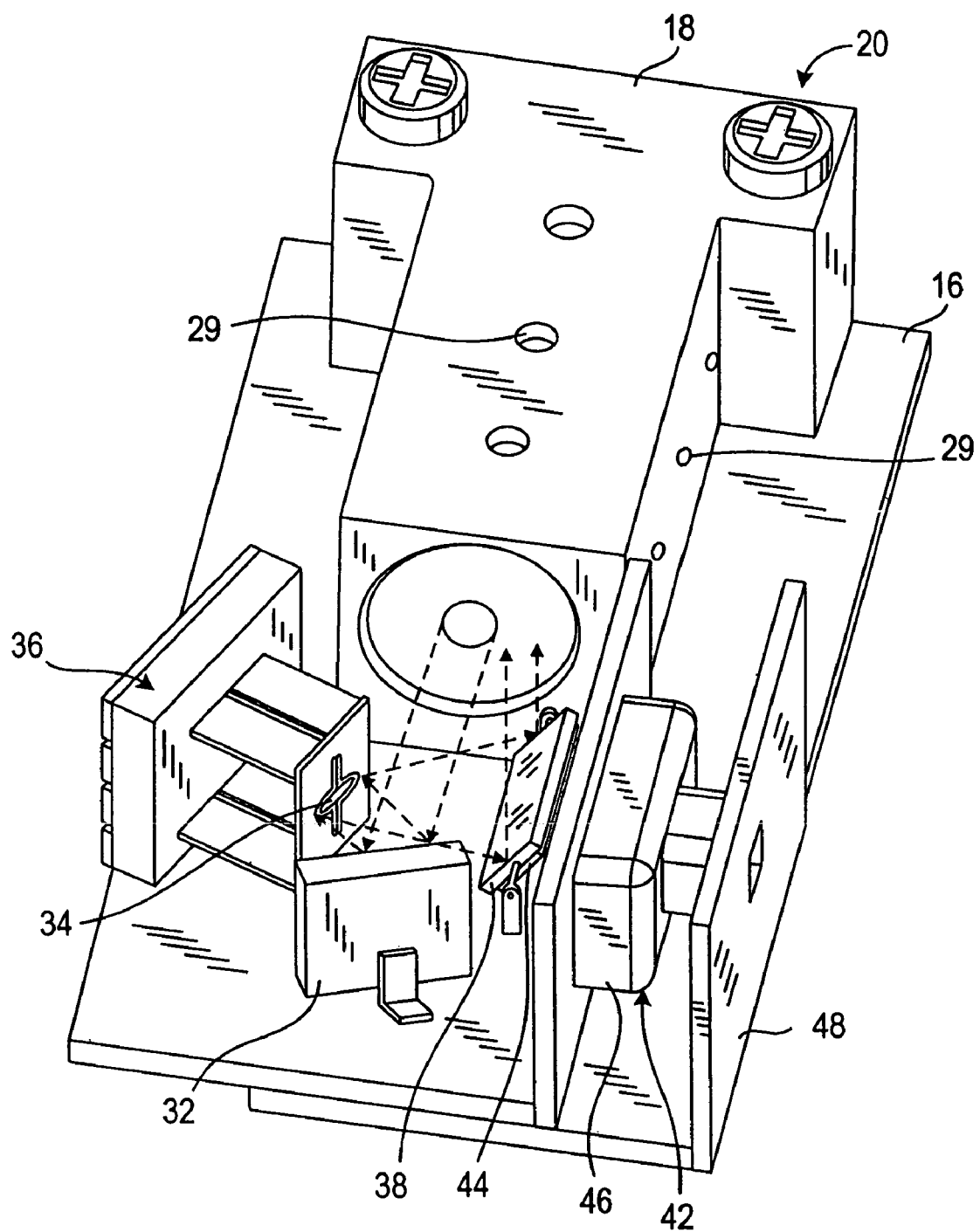
FIG. 2 is an enlarged, overhead, perspective view of one image projection module for installation in the arrangement of FIG. 1.

Reference numeral 10 in FIG. 1 generally identifies a housing in which a plurality of lightweight, compact, image projection modules 20, as shown in FIG. 2, is mounted. Each module 20 is operative for projecting a two-dimensional image at the same distance from the module. As described below, each image is comprised of illuminated and non-illuminated pixels on a raster pattern 30, 40 of scan lines swept by a scanner in module 20, and the two images are combined together to form a single image of large size. Both raster patterns 30, 40 preferably have the same optical horizontal scan angle extending along the horizontal direction, and the same optical vertical scan angle extending along the vertical direction, of the respective image.

The parallelepiped shape of the housing 10 represents just one form factor in which the modules 20 may be incorporated. In the preferred embodiment, each module 20 measures about 30 mm×15 mm×10 mm or about 4.5 cubic centimeters. This compact, miniature size allows each module 20 to be mounted in housings of many diverse shapes, large or small, portable or stationary.

Referring to FIG. 2, each module 20 includes a support 16, for example, a printed circuit board, and a laser/optics casing 18 in which are mounted a laser 25 (see FIG. 5) and a lens assembly, including one or more lenses and preferably a pair of lenses 22, 24 operative for optically modifying a laser beam emitted by the laser 25.

Figure 5:
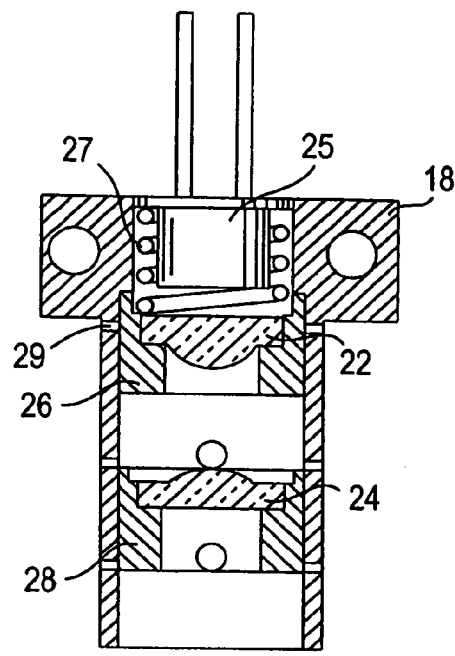
FIG. 5 is an enlarged sectional view of the laser/optics assembly of each module as taken on line 5-5 of FIG. 3.
Figure 4:
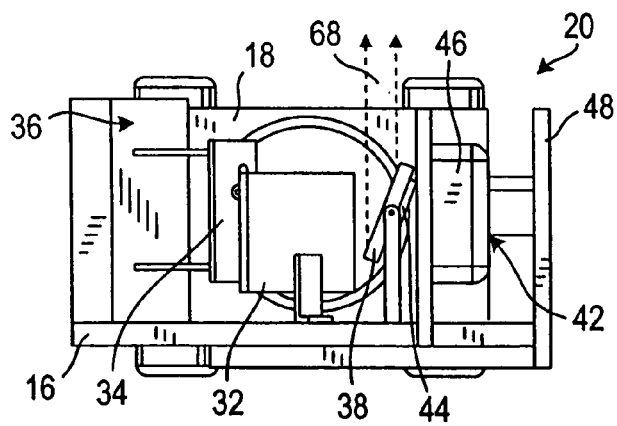
FIG. 4 is an end elevational view of the module of FIG. 2.

As best seen in FIG. 5, the laser 25 is a solid-state laser, preferably, a semiconductor laser, which, when energized, emits a laser beam having an oval cross-section. Lens 22 is a biaspheric convex lens having a positive focal length of about 2 mm and is operative for collecting virtually all the energy in the beam and for producing a diffraction-limited beam. Lens 24 is a concave lens having a negative focal length of about −20 mm. Lenses, 22, 24 are held by respective lens holders 26, 28 about 4 mm apart inside the casing 18 and are fixed in place by allowing an adhesive (not illustrated for clarity) introduced during assembly into the fill holes 29 to set. A coil spring 27 assists in positioning the laser. The lenses 22, 24 shape the beam profile.

The laser beam exiting the casing 18 is directed to, and reflected off, an optional stationary bounce mirror 32. A scanner is also mounted on the board 16 and includes a first scan mirror 34 oscillatable by an inertial drive 36 at a first scan rate to sweep the laser beam reflected off the bounce mirror over the first horizontal scan angle A (see FIG. 6), and a second scan mirror 38 oscillatable by an electromagnetic drive 42 at a second scan rate to sweep the laser beam reflected off the first scan mirror 34 over the second vertical scan angle B (see FIG. 6). In a variant construction, the scan mirrors 34, 38 can be replaced by a single two-axis mirror.

The inertial drive 36 is a high-speed, low electrical power-consuming component. Details of the inertial drive can be found in U.S. patent application Ser. No. 10/387,878, filed Mar. 13, 2003, assigned to the same assignee as the instant application, and incorporated herein by reference thereto. The use of the inertial drive reduces power consumption of the module to less than one watt and, in the case of projecting a color image, as described below, to less than ten watts.

The electromagnetic drive 42 includes a permanent magnet 44 jointly mounted on and behind the second scan mirror 38, and an electromagnetic coil 46 operative for generating a periodic magnetic field in response to receiving a periodic drive signal. The coil 46 is adjacent the magnet 44 so that the periodic field magnetically interacts with the permanent field of the magnet 44 and causes the magnet and, in turn, the second scan mirror 38 to oscillate. The coil 46 is supported by an upright wall 48 connected to the board 16.

The inertial drive 36 oscillates the scan mirror 34 at a high speed at a scan rate preferably greater than 5 kHz and, more particularly, on the order of 18 kHz or more. This high scan rate is at an inaudible frequency, thereby minimizing noise and vibration. The electromagnetic drive 42 oscillates the scan mirror 38 at a slower scan rate on the order of 40 Hz which is fast enough to allow the image to persist on a human eye retina without excessive flicker.

The faster mirror 34 sweeps a horizontal scan line, and the slower mirror 38 sweeps the horizontal scan line vertically, thereby creating a raster pattern which is a grid or sequence of roughly parallel scan lines from which the image is constructed. Each scan line has a number of pixels. The image resolution is preferably VGA quality of 640×480 pixels. In some applications, a one-half VGA quality of 320×480 pixels, or one-fourth VGA quality of 320×240 pixels, is sufficient. At minimum, a resolution of 160×160 pixels is desired.

The roles of the mirrors 34, 38 could be reversed so that mirror 38 is the faster, and mirror 34 is the slower. Mirror 34 can also be designed to sweep the vertical scan line, in which event, mirror 38 would sweep the horizontal scan line. Also, the inertial drive can be used to drive the mirror 38. Indeed, either mirror can be driven by an electromechanical, electrical, mechanical, electrostatic, magnetic, or electromagnetic drive.

Each image is constructed by selective illumination of the pixels in one or more of the scan lines. As described below in greater detail with reference to FIG. 7, a controller causes selected pixels in the raster patterns 30, 40 to be illuminated, and rendered visible, by the respective laser beam. For example, a power controller 50 conducts an electrical current to the laser 25 to energize the latter to emit light at each selected pixel, and does not conduct an electrical current to the laser 25 to deenergize the latter to non-illuminate the other non-selected pixels. The resulting pattern of illuminated and non-illuminated pixels comprise each image, which can be any display of human- or machine-readable information or graphic. Instead of a power controller, an acousto-optical modulator could be used to deflect the laser beam away from any desired pixel to non-illuminate the pixel by not allowing the laser beam to reach the first scan mirror.

Figure 6:
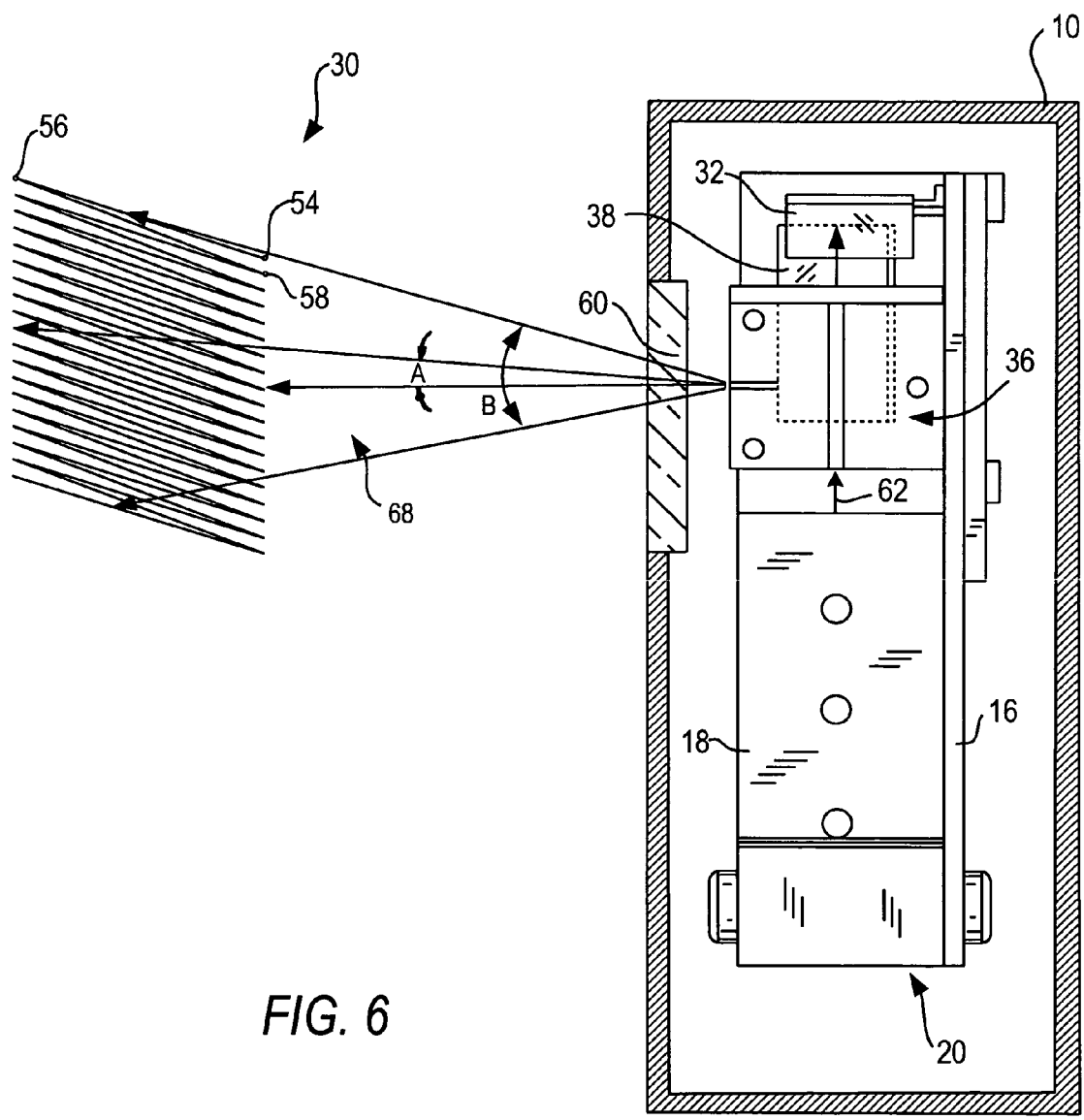
FIG. 6 is an enlarged sectional view taken on line 6-6 of FIG. 1.

Referring to FIG. 6, the representative raster pattern 30 is shown in an enlarged view. Starting at point 54, the laser beam is swept by the inertial drive along the horizontal direction at the horizontal scan rate to the point 56 to form a scan line. Thereupon, the laser beam is swept by the electromagnetic drive along the vertical direction at the vertical scan rate to the point 58 to form a second scan line. The formation of successive scan lines proceeds in the same manner.

The image is created in the raster pattern 30 by energizing or pulsing the laser on and off at selected times under control of a microprocessor or control circuit by operation of the power controller 50, or by maintaining the laser on and deflecting the laser beam at selected times by operation of an acousto-optical modulator. The laser produces visible light and is turned on, or its beam is properly deflected, only when a pixel in the desired image is desired to be seen. The raster pattern is a grid made of multiple pixels on each line, and of multiple lines. The image is a bit-map of selected pixels. Every letter or number, any graphical design or logo, and even machine-readable bar code symbols, can be formed as a bit-mapped image.

Figure 3:
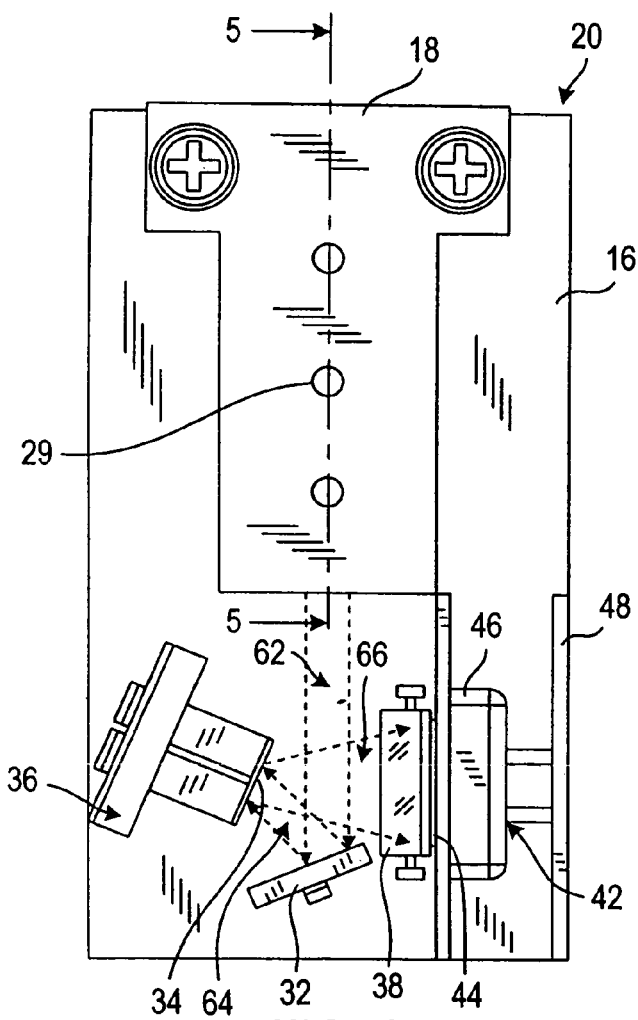
FIG. 3 is a top plan view of the module of FIG. 2.

FIG. 6 also shows a light-transmissive port or window 60 on the housing 10 and through which the images are projected in a direction generally perpendicular to the printed circuit board 16. Again, with reference to FIG. 3, the optical path of each laser beam has a vertical leg 62 between the laser/optics casing 18 and the bounce mirror 32, an inclined leg 64 toward the left to the scan mirror 34, a horizontal leg 66 toward the right to the scan mirror 38, and a forward leg 68 (see FIG. 6) in a direction toward the viewer and perpendicular to the board 16. The images can be projected on any translucent or reflective surface, such as screen 12.

Figure 7:
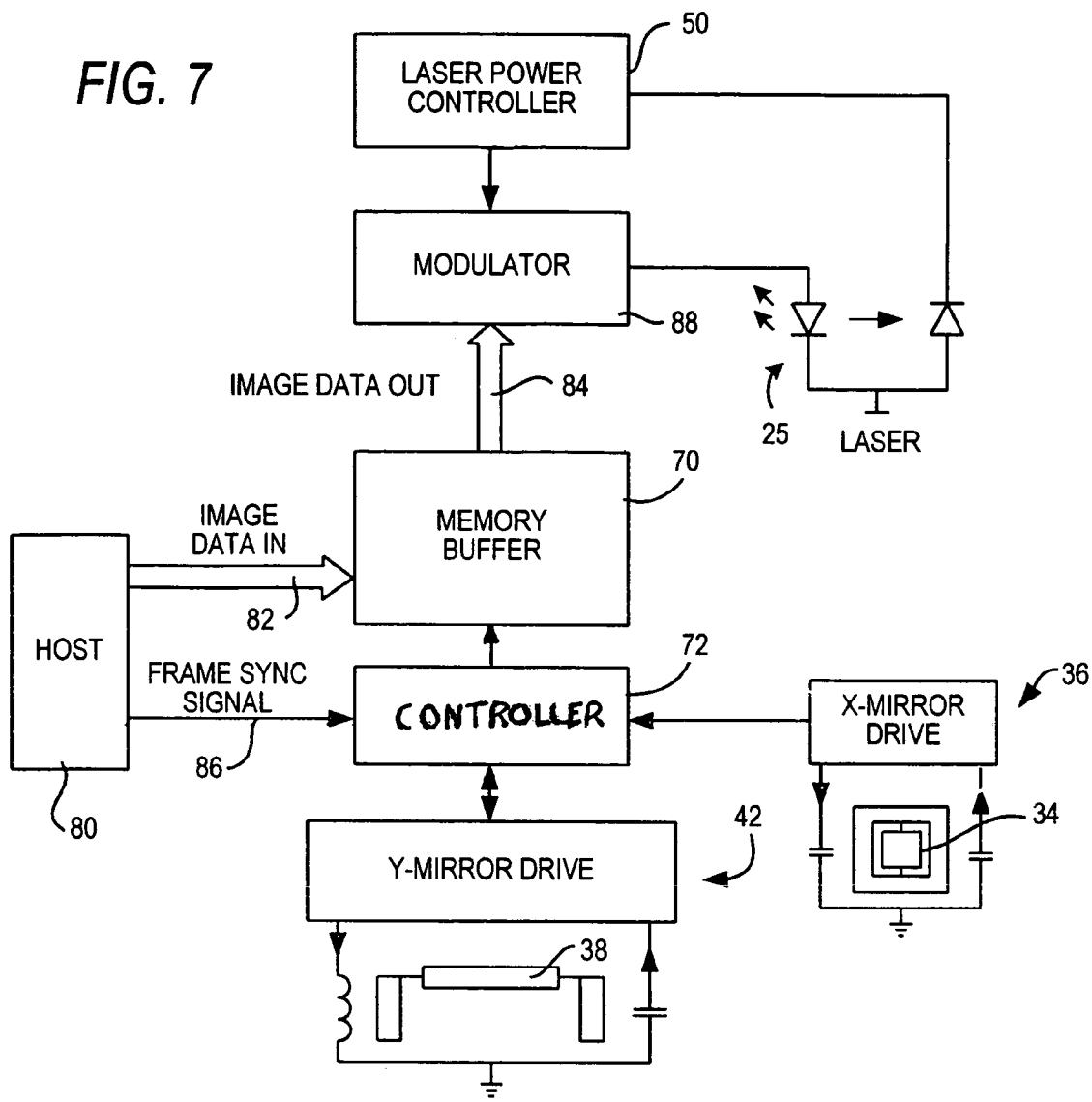
FIG. 7 is an electrical schematic block diagram depicting operation of each module of FIG. 2.

As shown in FIG. 7, a host 80 sends the bit-mapped image data 82 to a memory buffer 70 which is controlled by a memory controller 72. The storage of one full VGA frame would require about 300 kilobytes, and it would be desirable to have enough memory in the buffer 70 for two full frames (600 kilobytes) to enable one frame to be written by the host, while another frame is being read and projected. On the other hand, if the size of the buffer is smaller than a full frame, then the controller 72 can begin displaying lines after the memory has reached its maximum storage capacity with data sent by the host, or there can be simultaneous reading from and writing to the buffer. A frame synchronization signal 86 is sent by the host to the controller 72.

The first scan mirror 34, also known as the high speed or X-axis mirror, is driven by the inertial drive 36 and is controlled by the memory controller 72. Similarly, the second scan mirror 38, also known as the slow speed or Y-axis mirror, is driven by the electromagnetic drive 42 and is controlled by the memory controller 72. Since the images are projected during both forward and backward scans of the X-axis mirror, every other line of image data is displayed in reverse order. Hence, either the host has to write the image data to the buffer in the reverse order, or the memory controller has to read the image data in the reverse order.

The X-axis mirror has a sinusoidal velocity profile. In a given time interval, the laser beam sweeps more pixels in the middle of each scan line than at the ends of each scan line. To avoid image distortion, either the memory controller 72 should clock the pixels at a variable clock rate, or the host should fill the buffer 70 with data in which the size of the pixels is varied. A variable clock rate is the preferred technique since it allows pixels of a fixed size to be shared with other displays.

The output of the buffer is a digital signal 84 which is frame-synchronized with the host, and clock-and line-synchronized with the X-axis mirror 34. This digital signal is sent to a modulator 88 which, in turn, controls the laser 25.

As previously mentioned, the modules 20 scan respective raster patterns 30, 40 on the screen 12, and a bit-mapped image is projected and formed in each raster pattern. To increase size, power and brightness of a display, the images from a plurality of modules 20 can be combined or tiled along one axis, or along two orthogonal axes. Seams between tiled images can be avoided by creating an overlap region 35 between the raster patterns 30, 40. Overlapping pixels from both patterns 30, 40 can be illuminated in the overlap region. The intensity of each overlapping illuminated pixel is reduced so that the combined intensity of the overlapping illuminated pixels matches that of the non-overlapped illuminated pixels, thereby preventing bright spots in the image.

As shown in FIG. 1, an image of the letter "A" and at least a vertical leg of the letter "B" is formed in pattern 30, while the same image of the vertical leg of the letter "B" and an image of the letter "C" is formed in pattern 40. Each of the overlapping pixels that form the vertical leg of the letter "B" in the overlap region 35 has reduced brightness, so that their combined brightness corresponds, for example, to the pixels forming the letter "C". The display of the letters "A, B, C" is, of course, larger than the display of any individual one of these letters.

In the overlap region 35, the scan lines from the patterns 30, 40 are merged, for example, to within one-half pixel of resolution, by linear extrapolation. For example, if there is a 5 pixel difference between the scan lines from patterns 30, 40 at opposite ends of the overlap region, then the overlap region is designed to be about 100 pixels long such that there will be a smooth (5%) transition across the overlap region. The length of the overlap region can be selected during manufacture during a calibration procedure in which the screen 12 is replaced by an array of photosensors whose output signals are measured and adjusted.

Figure 14:
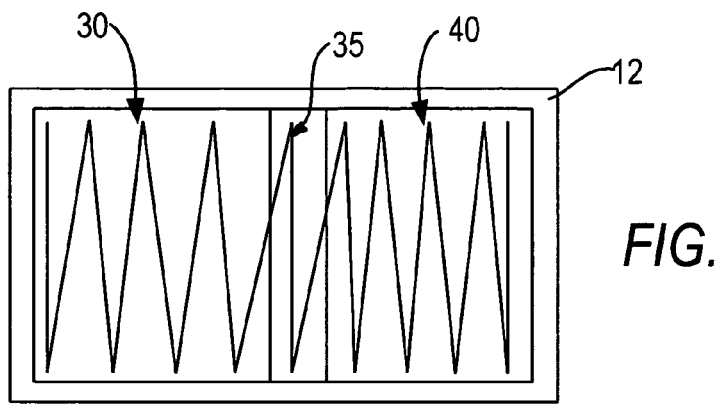
FIG. 14 is a front elevational view of a screen on which vertical scan lines are aligned.

The scan lines depicted in FIG. 1 are generally horizontal. It is also contemplated that the scan lines extend along the vertical direction as shown in FIG. 14 and, indeed, this is the preferred embodiment. The patterns 30, 40 still overlap, and, in region 35 for example, can overlap for a single scan line, or for multiple scan lines. The rightmost vertical scan line of pattern 30 is aligned with the leftmost vertical scan line of pattern 40, and the intensity of each overlapping line is reduced, for example, by half. Tiling of images from respective patterns can be performed along the horizontal and/or vertical directions.

By tiling images, large-sized displays on the order of twenty to eighty inches along each axis are obtainable. To project the large-sized image, it is not necessary to use a single high power laser which is not always available, may cost too much, or does not possess sufficient reliability.

Figure 8:
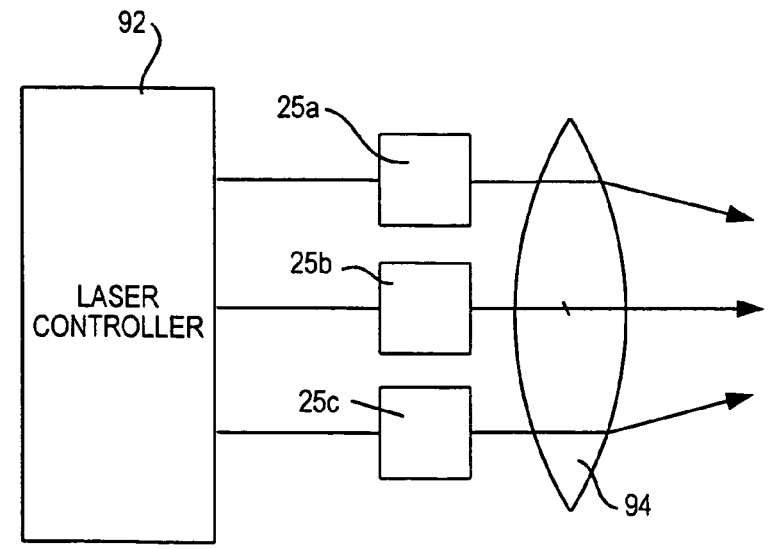
FIG. 8 is a schematic view of multiple single mode lasers used for increasing output power.

For color displays in which red, green and blue lasers are used, some lasers, such as the red laser, have good beam quality, but insufficient output power to create a bright, visible image. To obtain sufficient output power, a plurality of single mode, red lasers 25a, 25b, 25c in FIG. 8 are mounted on a common heat sink, and a common focusing lens 94 is used to focus the respective laser beams into three, red laser spots that are spaced apart from one another. A laser controller 92 is operative to pulse the respective lasers 25a, b, c at the exact time when the respective laser spot illuminates a specific pixel, preferably within a frame interval of about 20 milliseconds which represents the maximum time that a human retina retains an image. When all three lasers have been independently activated within one such frame interval, an observer will not know that the combined red illumination came from three different lasers activated at different times. Since the three laser beams are not mutually coherent, total speckle noise will be reduced.

Figure 9:
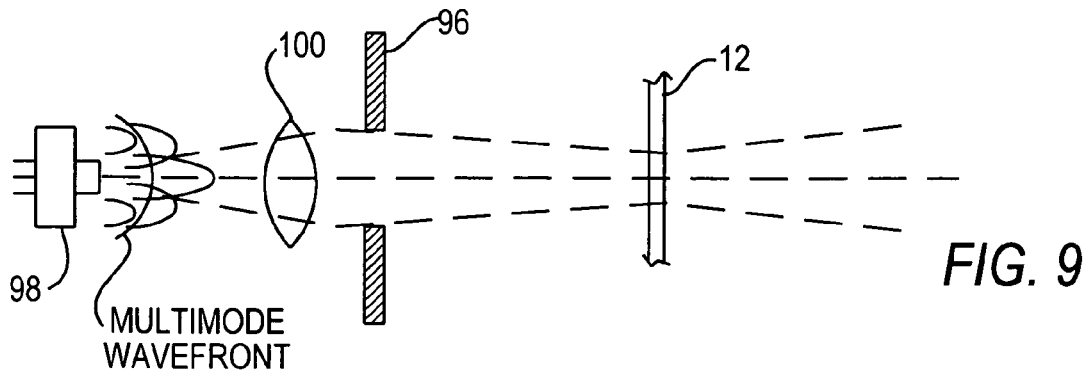
FIG. 9 is a diagrammatic view of a multimode laser used for increasing output power.

Another way to obtain sufficient output power is to use a single multimode laser 98 whose output power is high, but whose beam quality is poor. An aperture stop 96, as shown in FIG. 9, is used to block those parts of the diverging beam which cannot be focused by lens 100 at the screen 12. The aperture stop can have a rectangular, circular or elliptical aperture, or can have an aperture with an undulating or wavy peripheral edge for optimization of the beam profile.

Figure 10:
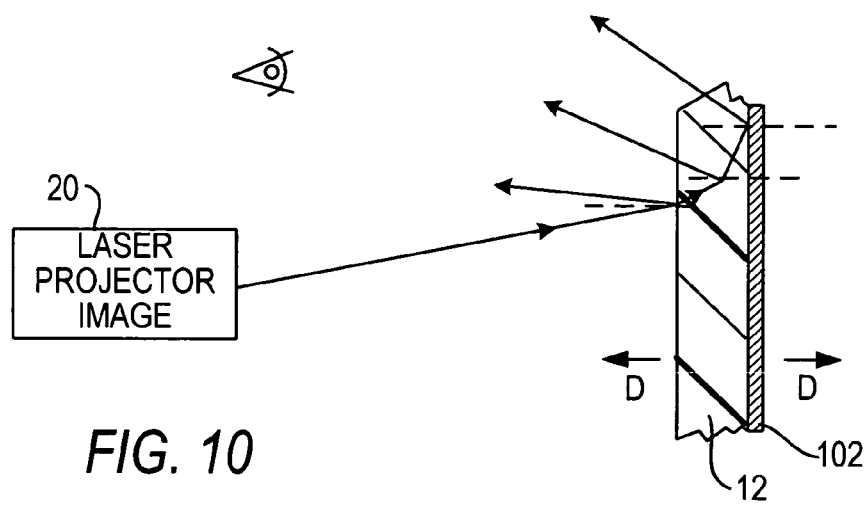
FIG. 10 is a diagrammatic view of a front projection screen of reduced speckle noise.

FIG. 10 depicts a front projection screen 12 having a total reflecting coating 102 at the side opposite to the laser image projector 20. The screen is constituted of a material, preferably plastic, having a slight transparency to the laser light. This has been found to reduce speckle noise because of multiple reflections from the front surface of the screen, the rear surface of the screen, and from intermediate different depths of the screen. These multiple reflections reduce image resolution, but for some applications, this is a worthwhile tradeoff for reducing speckle noise.

Figure 11:
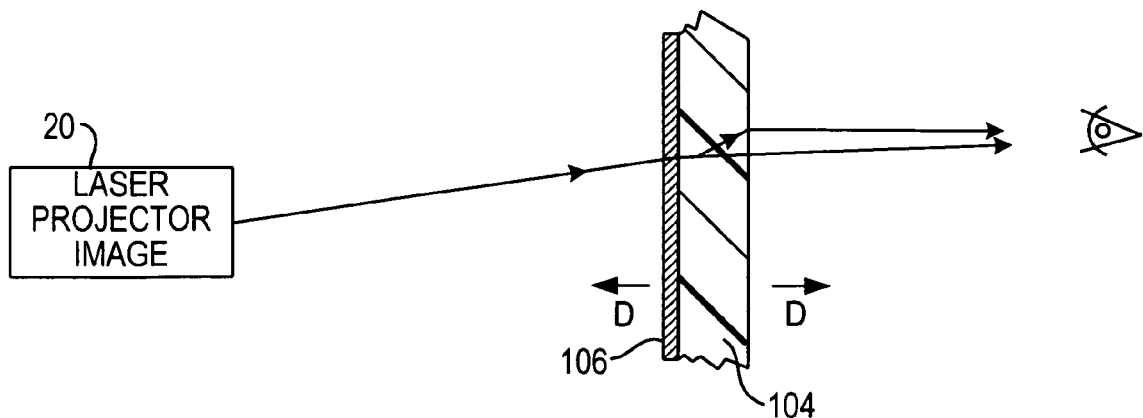
FIG. 11 is a diagrammatic view of a rear projection screen of reduced speckle noise.

FIG. 11 depicts a rear projection screen 104 having an anti-reflective coating 106 at the same side as the laser image projector 20. The thickness and optical transmission characteristics of the screen 104 have been found to reduce speckle noise, again at the expense of image resolution.

The arrows D in FIGS. 10-11 depict the movement of the screen 12 or 104 at a rate of about 30 Hz. This screen movement, combined with the projection and focusing of different images at different distances to the screen, is employed to create a three-dimensional display. The screen movement need not only be back-and-forth along the direction of the laser beam propagation, but could also be circular.

Still another feature related to a movable screen is a display monitor whose housing is collapsible. The monitor can be shipped flat and erected at a retail site, or at a customer's premises. The screen is mounted on the erected housing in position to enable a viewer to see the image projected on the screen.

Figure 12:
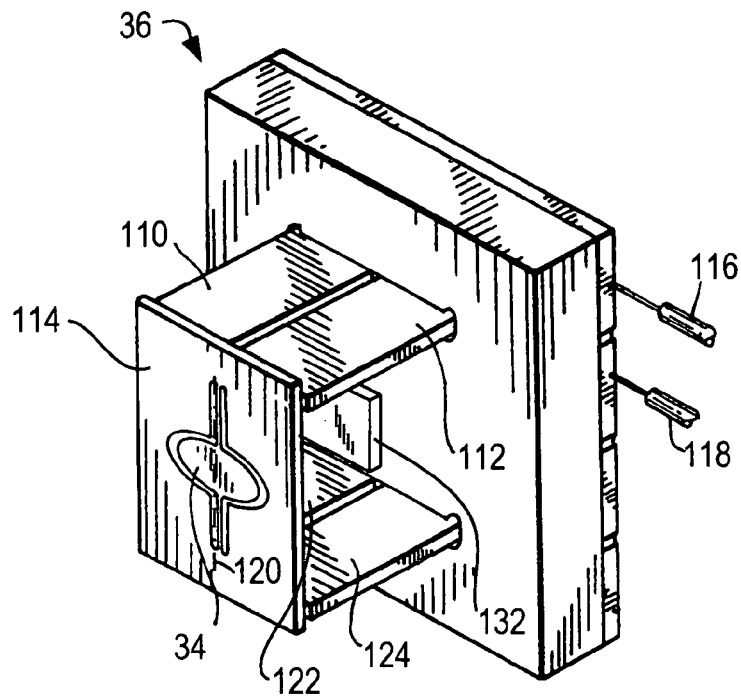
FIG. 12 is a front perspective view of a drive with minimized cross-coupled signals.
Figure 13:
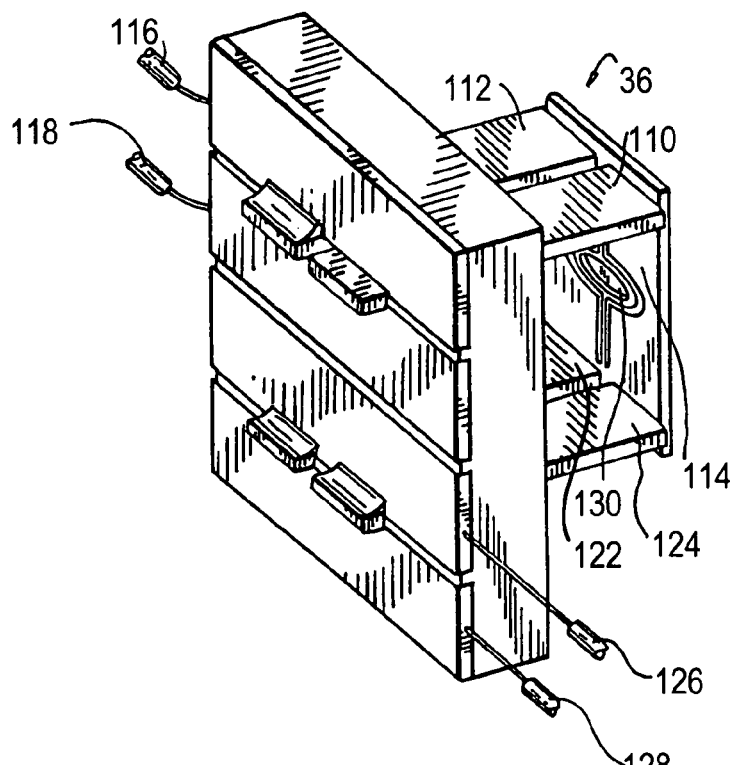
FIG. 13 is a rear perspective view of the drive of FIG. 12.

FIGS. 12-13 depict the inertial drive 36 in isolation. As described in the aforementioned U.S. patent application Ser. No. 10/387,878, filed Mar. 13, 2003, an upper pair of piezoelectric transducers 110, 112 contacts spaced-apart portions of a frame 114 above the scan mirror 34 and is electrically connected by wires 116, 118 to a periodic alternating voltage source. In use, the periodic source causes the transducers 110, 112 to alternatingly extend and contract in length, thereby causing the frame 114 to twist about a hinge axis 120. The scan mirror 34 is connected to the frame at opposite ends of the hinge axis and oscillates about the hinge axis at a resonant frequency.

A lower pair of piezoelectric transducers 122, 124 contacts spaced-apart locations of the frame 114 below the scan mirror 34. The transducers 122, 124 serve as feedback or pick-up mechanisms to monitor the oscillating movement of the frame and to generate and conduct electrical feedback signals along wires 126, 128 to a feedback control circuit.

However, vibrations induced by the transducers 110, 112 are detected by the transducers 122, 124 and tend to corrupt the feedback signals, thereby adversely affecting the projected image. Hence, another feature of this invention resides in making the drive and pick-up mechanisms different, for example, that both mechanisms are not based on the piezoelectric effect. This invention therefore proposes that one of the mechanisms be based on a different type of mechanism. For example, as shown in FIG. 13, a magnet 130 is jointly mounted behind the mirror 34 for joint oscillation therewith, and an electromagnetic feedback coil 132, as shown in FIG. 12, is mounted adjacent the magnet 130. The coil 132 senses the periodic electromagnetic field induced by the moving magnet and is immune from vibrations from the transducers 110, 112.

Figure 15:
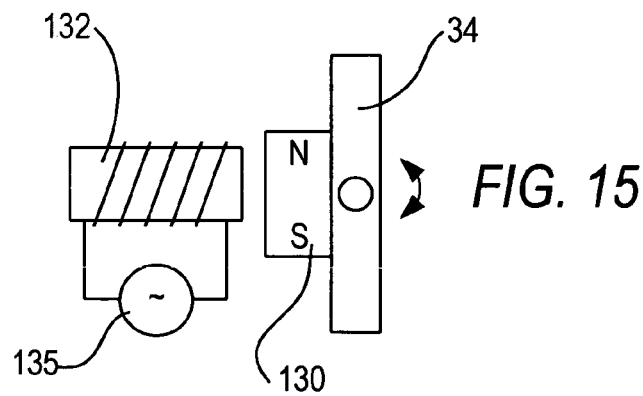
FIG. 15 is an electrical circuit of an electromagnetic feedback circuit of the drive of FIGS. 12-13.
Figure 16:
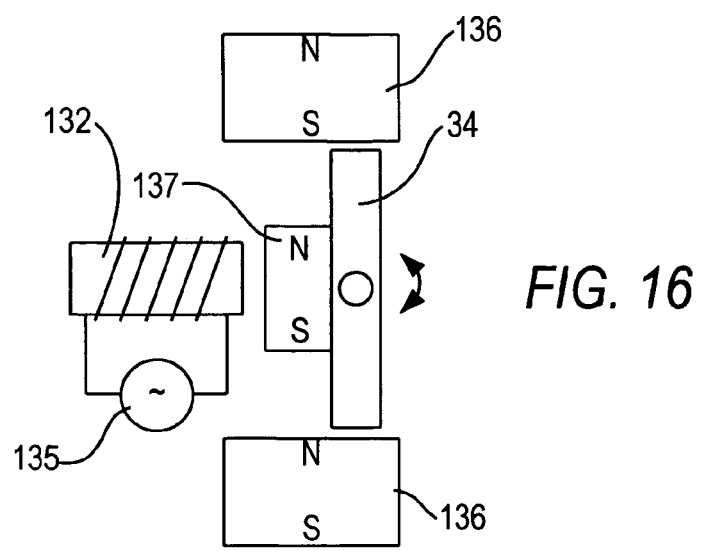
FIG. 16 is an electrical circuit of a variation of the feedback circuit of FIG. 15.

FIG. 15 depicts an electrical schematic of this feedback circuit with the coil 132 connected to a periodic source 135. FIG. 16 shows a variation in which the permanent magnet 130 is replaced by a soft ferromagnetic material 137 jointly mounted to the scan mirror, and a pair of permanent field magnets 136 operative to induce a static electromagnetic field in the soft material 137.

The soft material 137 can be steel, nickel, ferrite, etc., and, despite having no residual magnetism, is advantageous over the permanent magnet 130, in that soft materials can be deposited, while permanent magnets are prefabricated and then separately mounted, in that high performance permanent magnets may demagnetize when fabricated into submillimeter pieces and subjected to elevated temperatures, and in that the saturation inductance of soft magnets exceeds the residual inductance of permanent magnets by a factor of about 1.5 so that the scan element with the soft magnet of FIG. 16 can generate higher torque or consume less power than the scan element with the permanent magnet of FIG. 15.

It will be understood that each of the elements described above, or two or more together, also may find a useful application in other types of constructions differing from the types described above.

While the invention has been illustrated and described as embodied in a large size image projection arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An arrangement for projecting an image, comprising:
 a) a plurality of image projection modules, each having a laser for emitting a laser beam and a scanner for sweeping a pattern of scan lines in space at a distance from the modules, each scan line having a number of pixels of fixed size, each pattern being partly overlapped at an overlap region, each scanner including a first oscillatable scan mirror for sweeping the respective laser beam along a first direction at a first variable scan rate and over a first scan angle, and a second oscillatable scan mirror for sweeping the respective laser beam along a second direction substantially perpendicular to the first direction, and at a second scan rate different from the first scan rate, and at a second scan angle different from the first scan angle; and b) a controller operatively connected to each laser and each scanner, for causing selected pixels to be illuminated, and rendered visible, by each laser beam to produce the image from each pattern, the selected pixels in the overlap region being illuminated at a lesser intensity than selected pixels not in the overlap region, the controller being operative for independently energizing each laser at a different time during a predetermined frame interval at respective selected pixels, and for clocking the pixels along the first direction at a variable clock rate corresponding to the first variable scan rate to avoid image distortion.

2. The arrangement of claim 1, wherein at least one of the scan mirrors is oscillated by an inertial drive.

3. The arrangement of claim 1, wherein each laser is a solid-state laser.

4. The arrangement of claim 1, wherein the controller includes means for merging the scan lines from each pattern in the overlap region.

5. The arrangement of claim 1, wherein the image has a resolution which comprises at least 160 pixels in each scan line, and at least 160 scan lines in each pattern.

6. A method of projecting an image, comprising the steps of:
  a) emitting a plurality of laser beams from a plurality of lasers;
  b) sweeping each laser beam along a first direction at a first variable scan rate and over a first scan angle, and also sweeping each laser beam along a second direction substantially perpendicular to the first direction and at a second scan rate different from the first scan rate and at a second scan angle different from the first scan angle, to form a plurality of patterns of scan lines in space, each scan line having a number of pixels of fixed size, each pattern being partly overlapped at an overlap region;
  c) causing selected pixels to be illuminated, and rendered visible, by each laser beam to produce the image from each pattern;
  d) illuminating the selected pixels in the overlap region at a lesser intensity than selected pixels not in the overlap region; and
  e) independently energizing each laser at a different time during a predetermined frame interval at respective selected pixels. and for clocking the pixels along the first direction at a variable clock rate correspondina to the first variable scan rate to avoid image distortion.

7. A method of creating an image from subimages, comprising the steps of:
  a) emitting a plurality of laser beams from a plurality of lasers;
  b) sweeping each laser beam along a first direction at a first variable scan rate and over a first scan angle, and also sweeping each laser beam along a second direction substantially perpendicular to the first direction and at a second scan rate different from the first scan rate and at a second scan angle different from the first scan angle, to form a plurality of patterns of scan lines in space, each scan line having a number of pixels of fixed size;
  c) causing selected pixels to be illuminated, and rendered visible, by each laser beam to produce a subimage from each pattern;
  d) independently energizing each laser at a different time during a predetermined frame interval at respective selected pixels. and for clocking the pixels along the first direction at a variable clock rate corresponding to the first variable scan rate to avoid image distortion; and
  e) tiling the subimages to create the image by overlapping the patterns at an overlap region.

* * * * *